United States Patent [19]

Kremkau

[11] 4,044,187
[45] Aug. 23, 1977

[54] FILM LAMINATES HAVING A REIRRADIATED LAYER

[75] Inventor: William P. Kremkau, Watkinsville, Ga.

[73] Assignee: W. R. Grace & Co., Duncan, S.C.

[21] Appl. No.: 580,103

[22] Filed: May 22, 1975

[51] Int. Cl.$^2$ .......................... B05D 3/06; B32B 7/02; B32B 27/08
[52] U.S. Cl. .................... 428/212; 138/118; 138/137; 138/141; 138/177; 156/272; 204/159.14; 427/44; 428/516; 428/518; 428/520
[58] Field of Search ............... 138/137, 141, 177, 118; 427/44; 428/212, 516, 518, 520; 156/272; 204/159.14

[56] References Cited
U.S. PATENT DOCUMENTS

| 2,907,675 | 10/1959 | Gaylord | 427/44 X |
| 3,022,543 | 2/1962 | Baird | 260/91.7 X |
| 3,741,253 | 6/1973 | Brax et al. | 138/141 X |
| 3,821,182 | 6/1974 | Baird et al. | 260/91.7 |

Primary Examiner—Michael R. Lusignan
Attorney, Agent, or Firm—John J. Toney; William D. Lee, Jr.; John B. Hardaway

[57] ABSTRACT

The seal strength, dimensional stability, bond strength between plies, and ink adhesion of certain film laminates may be significantly increased by irradiating the substrate, forming the laminate, and then irradiating the entire laminate whereas in the prior art the practice is to only irradiate the substrate layer prior to forming the laminate.

20 Claims, No Drawings

FILM LAMINATES HAVING A REIRRADIATED LAYER

FIELD OF THE INVENTION

This invention relates to laminates having layers of cross-linked polymeric material and, in particular, to laminates having polyolefin layers that have been cross-linked by irradiation.

BACKGROUND OF THE INVENTION

Polymeric film laminates which include a gas impervious layer are quite suitable packaging materials. Laminates of saran and polyolefins are among the better known of these laminates. One particularly useful prior art laminate of this type is described in U.S. Pat. No. 3,741,253 which issued to Harri J. Brax et al. on June 26, 1973. In the Brax patent, an ethylene vinyl acetate copolymer is the substrate material and the substrate is cross-linked by electron irradiation. Following the cross-linking procedure a saran layer and an additional ethylene vinyl acetate copolymer layer are coated by extrusion onto the substrate. However, neither of these two subsequent layers are cross-linked.

In another prior art patent, U.S. Pat. No. 3,821,182 which issued to William G. Baird, Jr. et al on June 28, 1974, a polyethylene/saran/polyethylene laminate is irradiated by electrons prior to being stretched and, as a result of multiple passes through the electron beam, all layers receive approximately equivalent exposure to the radiation and layers of the same material are cross-linked by the radiation to the same extent.

It has now been surprisingly discovered that certain laminate structures are improved and may be successfully stretched and oriented when all layers have been irradiated and like layers have not been cross-linked to the same extent. Thus, it is one object of the present invention to provide a process for producing laminates in which all layers have been irradiated and cross-linked but in which at least one layer is cross-linked to a greater extent than any other layer.

In addition, in certain prior art laminates such as polyolefin/saran laminates, dimensional stability and delamination have been problems for those structures subjected to severe abuse, particularly at elevated temperatures. Accordingly, it is another object of the present invention to provide a laminate material having superior abuse resistance and dimensional stability.

The foregoing and other objects may be achieved by an irradiated laminate wherein one of the layers has been irradiated to a greater extent than any other layer. This discovery will be better understood by reference to the paragraphs below.

SUMMARY OF THE INVENTION

In one aspect, the present invention is a method of preparing a polymeric film laminate with at least one cross-linked layer and at least one non-cross-linked layer which is cross-linkable by irradiation; and, thereafter irradiating said laminate.

In another aspect the present invention is a method of improving the properties of film laminates comprising the steps of: (1) providing a cross-linkable substrate; (2) irradiating the substrate to a dosage in the range between 2 and 20 MR; (3) applying a layer of relatively gas impermeable material to one side of said substrate; (4) applying a cross-linkable layer to said impermeable layer thereby forming a laminate having layers of a cross-linked substrate, unirradiated impermeable material, and unirradiated cross-linkable material; (5) stretching said laminate thereby thinning same to a predetermined film thickness; and, (6) irradiating said laminate to a dosage level in the range of 2 to 10 MR.

In still another aspect the subejct invention is a method of improving the properties of polyolefin/saran or polyolefin/ethylene vinyl alcohol copolymer film laminates which initially have only one cross-linked layer in which the method comprises the step of irradiating the laminate to a dosage between 2 and 10 MR.

In one more aspect, the present invention is a polymeric laminate having at least two cross-linked layers, one of which is cross-linked to a greater extent than the other.

In yet another aspect the subject invention is a film laminate comprising a saran or ethylene vinyl alcohol copolymer layer; and, a plurality of cross-linked polyolefin layers, at least one polyolefin layer being cross-linked to a greater extent than any other polyolefin layer.

DEFINITIONS

"Saran" as used herein includes normally crystalline polymers, both homopolymers and copolymers, containing vinylidene chloride. As copolymerizable materials there can be used vinyl chloride, acrylonitrile vinyl acetate, ethyl acetate, and methyl methacrylate. Terpolymers can also be employed, e.g., a terpolymer of vinylidene chloride, dimethyl maleate and vinyl chloride. In general, the vinylidene chloride constituent is at least 50 percent of the material in the polymer, and preferably in the range of 60 to 80 percent.

"Polyolefin" as used herein means an alpha monoolefin and specifically includes polymers of propylene, ethylene, and butene-1.

"Polymer" as used herein includes homopolymers, copolymers, terpolymers, and block or graft copolymers.

"Irradiation" means exposure to ionizing radiation which has the ability to induce molecular cross-linking. Generally, these forms of radiation will be either gamma or X-rays or beta particles or electrons. The most common radiation would be electrons from a high energy accelerator.

"EVAL" as used herein is ethylene vinyl alcohol copolymer which is alternately referred to as hydrolyzed or saponified ethylene vinyl acetate copolymer. Preferably the saponification is carried to a high degree, e.g. greater than 90%.

"Gas impermeable", "gas impervious", and "relatively gas impervious or impermeable" as used herein means a material or material layer through which very little gas can be transmitted and will have a permeability of less than 70 cc/m$^2$/mil/24 hrs. at atmospheric pressure and 73° F.

"Rad" is the absorbed dose of ionizing radiation equal to an energy of 100 ergs per gram of irradiated material. The term megarad or "MR" means 1,000,000 rads.

PREFERRED EMBODIMENT

In one preferred embodiment a laminate is prepared by providing a substrate of cross-linked polymeric material which has been cross-linked either chemically or by ionizing radiation to a dosage in the range between 2 and 20 MR. Such a substrate is preferably tubular but may be flat and the substrate material may be either polyethylene or ethylene vinyl acetate copolymer having 2% to 20% vinyl acetate units by weight and the substrate thickness is preferably in the range of 0.5 to 5.0 mils. The material of the next layer is preferably one which is gas impervious such as a copolymer of vinylidene chloride and vinyl chloride or EVAL and may be 0.05 to 2 mil thick. While not essential, a third layer is preferred and this layer may be of the same material as the substrate and can range in thickness from 0.1 to 4.0 mils. The method for coating both layers onto the substrate is extrusion coating which is a well-known prior art technique. After the final laminate is prepared it is irradiated to a dosage level in the range of 2 to 20 MR and then stretched to the desired film thickness.

Polyolefin materials are preferred for the substrate and outer layers of the present invention because of their cost, availability, and improved properties when cross-linked. EVAL will also cross-link as will saran when subjected to irradiation. In polyolefins, such as polyethylene and polymeric materials with a high proportion of ethylene, substantial cross-linking occurs at the 2 MR level and measurable insoluble gel is present.

In another preferred embodiment ethylene vinyl acetate copolymer resin having between 2 and 4% vinyl acetate units is fed into a conventional extruder and a tube having a diameter of 2 to 2 inches is extruded. The thickness of the tubing wall is about 18 mils. This tubing is then cooled, flattened, and irradiated to a dosage level of 6 to 7 MR, but for other polyolefins this may be in the range of 2 to 20 MR. After irradiation, the flattened tubing is inflated and passed through a conventional coating die which is fed from an extruder which is supplied with saran resin. The preferred saran is a copolymer having about 70% vinylidene chloride and about 30% vinyl chloride. As an alternate preferred embodiment, up to about 5% by weight of ethylene vinyl acetate copolymer may be blended in the saran resin. The saran ply or layer will have a preferred thickness of about 3 mils.

After the saran layer has been coated onto the irradiated substrate, the inflated tubing passes through a second extrusion coating die fed by an extruder wherein the extrudate is a blend of polybutene-1 with an ethylene-propylene copolymer having an ethylene constituent in the range of 0.1 to 10% by weight. The ethylene-propylene copolymer should be the major portion of the blend with the polybutene-1 being the minor portion on a weight basis. Preferably, the ethylene-propylene copolymer will comprise between 70 and 80% of the blend. This coating material will be applied to have a thickness of about 6 mils. As an alternate material, polypropylene may be used, or a blend of isotactic and atactic polypropylene with polybutene-1 may be used.

After the tubular irradiated substrate has received the saran and polyolefin coatings, it is stretched by the well known bubble technique wherein the tubing is inflated or re-inflated to elevated pressure, closed at the down stream end by pinch rolls, and then heated in the temperature range of 180° to 210° F whereby the tubing stretches and expands. The tubing is preferably stretched from its extruded diameter of about 2 inches to its final diameter of about 6 to 7 inches. The tubing is then cooled and flattened and subjected to electron irradiation to a dosage of about 10 MR. However, for other polyolefin materials satisfactory cross-linking may be achieved as low as 2 MR as this is the dosage level at which significant insoluable gel begins to occur.

The resulting tubing may be heat sealed together at various intervals and then cut to provide bags, or the material may be cut into segments and one end closed by a metal clip to provide a casing. These bags and casings may be filled with food products and the open end sealed or closed after which the food product may be water cooked or heated in water to temperatures in the range of 180° to 205° F. To improve heat transfer, the filled casings may be agitated severely during the heating and cooking process. Filled bags and casings according to the present invention show superior resistance to delamination and exhibit good dimensional stability under such abusive conditions.

EXAMPLE I

Tubular laminate as described above was prepared with a substrate of ethylene vinyl acetate copolymer having about 2 ½% vinyl acetate units and a saran coating in which the saran had approximately 5% ethylene vinyl acetate copolymer blended therein. The outer coating consisted of about 70% ethylene-propylene copolymer with about 30% polybutene-1. The substrate was irradiated to a dosage level of 6.3 MR and 500 ft. segments of the laminated casing of 6 to 7 inches diameter were irradiated to dosages of 2.5, 5, 7.5 and 10 MR respectively. Also, a 500 ft. segment of the laminated casing was prepared and was not given the additional irradiation dosage. All of the material was then placed in 180° F water for 30 minutes. The following results were observed:

No irradiation: Air blisters between layers throughout the casing material showing delamination.

2½ MR dosage: Air blisters along fold lines and random throughout the casing material.

5 MR dosage: Blisters along fold line and scattered blisters throughout but no blisters more than ¼ inch to ½ inch in diameter.

7½ MR: ¼ inch blisters observed along fold line and small scattered blisters at random less than 1/16 in diameter.

10 MR dosage: No blisters visually observable anywhere on casing material.

The air blisters are the nucleating points for delamination; and, the 10 MR dosage level effectively eliminated these blisters. However, no delamination actually occurred above the 2½ MR dosage and the blister size decreased with increasing dosage.

EXAMPLE II

Casings were prepared as in Example I and then at 22 inch intervals clips were applied and sample tubing segments from each dosage level were inflated to internal pressures of 2, 4, and 6 p.s.i. gauge respectively. All tubing at the 2 psi level had a circumference of 12¼ inches. The results were as follows:

| PSI | 0 | 2.5 MR | 5 MR | 7.5 MR |
| --- | --- | --- | --- | --- |
| 2 | 12 ¼"D | 12 ¼"D | 12 ¼"D | 12 ¼"D |
| 4 | 13 ⅜" | 12 ¼" | 12 ⅝" | 12 ⅝" |
| 6 | * | 14 ⅝" | 13 ⅝" | 13 ¼" |

*Complete distortion, casing too likely to burst so that measurement was not taken.

The foregoing indicates the improvement in dimensional stability that is achieved by the increasing dosage level. At the lower dosage levels significantly greater stretching and distortion of the casings occurs.

While preparing laminates having constructions similar to the preferred embodiment, it was found that if the substrate were not irradiated then great difficulty was encountered in establishing and maintaining a trapped bubble for continuous production as the bubbles too easily rupture. Furthermore, it was found that if all layers were given the final total irradiation dosage at once that the tubing was too resistant to expansion to successfully stretch it. This process is, therefore, applicable generally to the production of laminates wherein the polymeric substrate must be strengthened by cross-linking and were a high degree of dimensional stability and resistance to delamination is desired.

Having thus described my invention, I claim:

1. A method of improving the properties of polymeric film laminates comprising the steps of:
  a. forming a laminate by preparing a layer that is cross-linked and applying at least one additional polymeric layer thereto, at least one of said additional layers being uncross-linked but being cross-linkable by irradiation; and,
  b. irradiating said laminate.

2. A method of improving the properties of film laminates comprising the steps of:
  a. providing a cross-linkable substrate;
  b. irradiating said substrate to a dosage in the range between 2 and 20 MR to cross-link same;
  c. applying a layer of a relatively gas impermeable material to said substrate;
  d. applying a layer of cross-linkable material to said impermeable layer thereby forming a laminate having layers of cross-linked substrate, unirradiated impermeable material, and cross-linkable material;
  e. stretching said laminate thereby thinning same to a predetermined film thickness; and,
  f. irradiating said laminate to a dosage level of at least 2.5 MR.

3. The method of claim 2 wherein said substrate is a polyolefin material.

4. The method of claim 3 wherein said polyolefin substrate is selected from the group comprising polyethylene and ethylene vinyl acetate copolymers.

5. The method of claim 2 wherein said impermeable material is selected from the group consisting of saran and ethylene vinyl alcohol copolymers.

6. The method of claim 2 wherein said cross-linkable material is a polyolefin material.

7. A method of improving the properties of polymeric film laminates comprising the steps of:
  a. providing a tubular polyolefin substrate;
  b. irradiating said substrate to a dosage in the range between 2 and 20 MR;
  c. extrusion coating said tubular substrate with a layer of saran;
  d. extrusion coating said saran layer with a layer of polyolefin material thereby forming a tubular laminate having an inner layer of irradiated polyolefin coated with unirradiated saran and polyolefin layers;
  e. stretching said laminate to thin same to film thickness; and,
  f. irradiating said laminate to a dosage of at least 2.5 MR.

8. The method of claim 7 wherein said substrate comprises a polymer of ethylene.

9. The method of claim 8 wherein said substrate comprises an ethylene-vinyl acetate copolymer.

10. The method of claim 7 wherein the coating of polyolefin material comprises a blend of polybutene-1 with an ethylenepropylene copolymer.

11. A method of improving the properties of polyolefin/saran film laminate which has been prepared by cross-linking said polyolefin layer and applying a saran layer thereto, said method comprising the steps of:
  a. stretching said laminate to a predetermined film thickness; and,
  b. irradiating said laminate to a dosage level of at least 2.5 MR.

12. The method of claim 11 wherein the initially cross-linked layer of said laminate comprises an ethylene polymer.

13. The method of claim 12 wherein said initially cross-linked layer comprises an ethylene/vinyl acetate copolymer.

14. A polymeric film laminate comprising a plurality of cross-linked layers, at least one of said layers being cross-linked to a greater degree than any other cross-linked layer.

15. A film laminate prepared according to the process of claim 11 comprising:
  a. at least one polyolefin layer, said layer being cross-linked by irradiation;
  b. at least one saran layer, said layer having been cross-linked by irradiation; and,
  c. at least one of said layers being cross-linked to a greater extent than any other layer.

16. A film laminate prepared according to the process of claim 1 comprising:
  a. a relatively gas impermeable layer; and,
  b. a plurality of cross-linked polyolefin layers, at least one polyolefin layer being cross-linked to a greater extent than any other polyolefin layer.

17. The laminate of claim 16 wherein one of said polyolefin layers is polyethylene.

18. The laminate of claim 16 wherein one of said polyolefin layers is an ethylene-vinyl acetate copolymer.

19. The laminate of claim 18 wherein another of said polyolefin layers comprises an ethylene-propylene copolymer.

20. The laminate of claim 16 wherein the material for said relatively gas impermeable layer is selected from the group consisting of saran and ethylene vinyl alcohol copolymers.

* * * * *

REEXAMINATION CERTIFICATE (1455th)
United States Patent [19]
Kremkau

[11] B1 4,044,187

[45] Certificate Issued   Apr. 30, 1991

[54] FILM LAMINATES HAVING A REIRRADIATED LAYER

[75] Inventor: William P. Kremkau, Watkinsville, Ga.

[73] Assignee: W. R. Grace & Co.

Reexamination Request:
No. 90/002,124, Sep. 5, 1990

Reexamination Certificate for:
Patent No.: 4,044,187
Issued: Aug. 23, 1977
Appl. No.: 580,103
Filed: May 22, 1975

[51] Int. Cl.$^5$ .................... B05D 3/06; B32B 7/02; B32B 27/08
[52] U.S. Cl. ................... 428/212; 138/118; 138/137; 138/141; 138/177; 156/272.2; 156/273.5; 427/44; 428/516; 428/518; 428/520; 522/153; 522/154
[58] Field of Search ............... 138/118, 137, 141, 177; 156/272.2, 273.5; 427/44; 428/212, 516, 518, 520; 522/153, 154

[56] References Cited

U.S. PATENT DOCUMENTS

| | | | |
|---|---|---|---|
| 3,644,161 | 2/1972 | Hall | 156/272.2 |
| 3,692,602 | 9/1972 | Okada et al. | 156/79 |
| 3,773,870 | 11/1973 | Spillers | 264/22 |
| 3,821,182 | 6/1974 | Baird et al. | 264/171 X |
| 3,899,807 | 8/1975 | Sovish et al. | 264/22 X |
| 4,044,187 | 8/1977 | Kremkau | 428/212 |

FOREIGN PATENT DOCUMENTS

| | | |
|---|---|---|
| 422013 | 7/1967 | Australia . |
| 1504685 | 9/1969 | Fed. Rep. of Germany . |
| 2132400 | 11/1972 | France . |
| 41-8957 | 5/1966 | Japan . |
| 49-106578 | 10/1974 | Japan . |
| 50-12167 | 2/1975 | Japan . |
| 974402 | 11/1964 | United Kingdom . |
| 1392212 | 4/1975 | United Kingdom . |

OTHER PUBLICATIONS

A. Charlesby, Atomic Radiation and Polymers, pp. 209-211, 261, 285, 303, and 317 (1960) (Ex. B).

*Primary Examiner*—Michael Lusignan

[57] ABSTRACT

The seal strength, dimensional stability, bond strength between plies, and ink adhesion of certain film laminates may be significantly increased by irradiating the substrate, forming the laminate, and then irradiating the entire laminate whereas in the prior art the practice is to only irradiate the substrate layer prior to forming the laminate.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-13, 15 is confirmed.

Claims 1, 14 are determined to be patentable as amended.

Claims 16-20, dependent on an amended claim, are determined to be patentable.

New claims 21-29 are added and determined to be patentable.

1. A method of improving the properties of polymeric film laminates comprising the steps of:
   a. forming a laminate by preparing a *polymeric* layer that is cross-linked and applying
      (i) *a relatively gas impermeable layer and*
      (ii) at least one additional polymeric layer thereto, at least one of said additional *polymeric* layers being uncross-linked but being cross-linkable by irradiation; and,
   b. irradiating said laminate.

14. A polymeric film laminate comprising:
   (i) *a relatively gas impermeable layer, and*
   (ii) a plurality of cross-linked layers, at least one of said layers being cross-linked to a greater degree than any other cross-linked layer.

*21. The polymeric film laminate of claim 14, wherein the relatively gas impermeable layer is selected from the group consisting of saran and ethylene vinyl alcohol copolymers.*

*22. The polymeric film laminate of claim 21, wherein the relatively gas impermeable layer is saran.*

*23. The polymeric film laminate of claim 21, wherein the relatively gas impermeable layer is positioned between the cross-linked layer that is cross-linked to a greater degree than any other cross-linked layer and another cross-linked layer.*

*24. The polymeric film laminate of claim 23, wherein the cross-linked layer that is cross-linked to a greater degree than any other cross-linked layer and another cross-linked layer are made of a polyolefin material.*

*25. The polymeric film laminate of claim 24, wherein the polyolefin material is selected from the group consisting of polyethylene, ethylene-vinyl acetate copolymers and mixtures thereof.*

*26. The polymeric film laminate of claim 25, wherein the relatively gas impermeable layer is saran.*

*27. The polymeric film laminate of claim 21, wherein the cross-linked layer that is cross-linked to a greater degree and another cross-linked layer are made of a polyolefin material.*

*28. The polymeric film laminate of claim 27, wherein the polyolefin material is selected from the group consisting of polyethylene, ethylene-vinyl acetate copolymers and mixtures thereof.*

*29. The polymeric film laminate of claim 28, wherein the relatively gas impermeable layer is saran.*

* * * * *